United States Patent [19]

Schoenwald

[11] 3,712,675
[45] Jan. 23, 1973

[54] PORTABLE DUMP BOX

[76] Inventor: Goenter Schoenwald, 10516-77th Avenue, Edmonton, Alberta, Canada

[22] Filed: June 7, 1971

[21] Appl. No.: 150,409

[30] Foreign Application Priority Data

May 31, 1971 Canada..................................114408

[52] U.S. Cl. ......................298/10, 298/17 S, 298/18, 298/22 R, 280/111
[51] Int. Cl. .............................................B60p 1/16
[58] Field of Search ........298/17 S, 10, 18; 280/6.11, 280/124

[56] References Cited

UNITED STATES PATENTS

| 1,990,798 | 2/1935 | Richter et al.........................280/6.1 |
| 2,999,721 | 9/1961 | Wood..................................298/17 S |
| 3,012,624 | 12/1961 | Lich .....................................180/9.5 |
| 3,328,019 | 6/1967 | Wilson..................................280/6 R |
| 3,554,576 | 1/1971 | Parker....................................298/24 |
| 3,205,011 | 9/1965 | Diem.......................................298/10 |

FOREIGN PATENTS OR APPLICATIONS 620,964   12/1959   Italy ........................................298/18

Primary Examiner—Richard J. Johnson
Assistant Examiner—R. Eisenzopf
Attorney—Smart & Biggar

[57] ABSTRACT

A portable dump box which serves as a temporary storage facility in the gathering of pay loads such as forage or snow is described. This apparatus has a levelling mechanism which interacts with its tilting mechanism and ensures that its frame remains level during both tilting and towing operations. The invention comprises a wheeled carriage including an axle having wheels rotatably mounted at opposite ends thereof, a frame, a dump box, means for tilting the dump box and means for maintaining the frame level. The axle is below and pivotably moveable relative to the frame about the longitudinal axis of the carriage. The dump box is hingedly joined to the frame along a longitudinal edge thereof at a point of the frame remote from the ground. The means for tilting the dump box comprises at least one hydraulic jack positioned to pivot the dump box on a hinged joint about an axis longitudinal to said frame. The means for maintaining the frame level comprises a pair of hydraulic jacks, a first member of each jack being fixed to the frame at or near opposite longitudinally extending edges thereof, a second member of each jack being fixed to the axle or at near opposite ends thereof, a hydraulic fluid line extending from one jack to the other, whereby an upward action on the first element in one jack produces a downward reaction in the second element of the other jack. There are valve means in the hydraulic fluid line having an open position permitting two-way flow of fluid and a closed position permitting no flow of fluid, the valve means being in the open position when the dump box is at rest and in the closed position during substantially the entire tilting operation.

8 Claims, 5 Drawing Figures

PATENTED JAN 23 1973

INVENTOR
GOENTER SCHOENWALD
BY Smart & Biggar
ATTORNEYS.

PORTABLE DUMP BOX

BACKGROUND OF THE INVENTION

1. Field of the Invention

This invention relates to a portable dump box. More particularly it relates to an improvement in a portable dump box which comprises an interacting tilting and frame levelling mechanism.

2. Description of the Prior Art

This invention is particularly useful in the harvesting of silage but is not strictly limited thereto. It is useful in any application wherein a temporary storage facility is needed in the collecting of bulky materials before the material is loaded into a primary carrier for its transport to another location. In harvesting silage, an apparatus which gathers the forage crop and then delivers it through a blowing nozzle is towed behind a tractor. It is possible to simply blow this crop directly into a dump truck being driven parallel to the tractor. However, if the farmer employs but one dump truck his apparatus stands idle while he awaits the return of the truck from emptying its load and if the storage area is a considerable distance from the harvesting area this means that a considerable amount of time spent in the field is downtime. To purchase or hire another dump truck is a very considerable expense which can be obviated by the use of the dump box of this invention which serves as a temporary storage area into which the crop can be blown while the farmer is awaiting the return of the truck from the storage area.

In blowing the crop directly into the truck considerable skill must be exercised in maintaining the blowing nozzle and the truck in a fixed spaced relationship to one another to avoid spillage of the crop onto the ground. The trailer of this invention is towed in tandem behind the blower apparatus so that the forage is blown directly backwardly into the front of the dump box. It thus remains in a fixed spaced relationship with the blower eliminating this problem.

Another possible use of the apparatus of this invention is in snow removal. It can be seen that analogously the dump box can serve as a temporary storage area in this application.

A dump box of this type specifically adapted to collect forage is known. However, the framework of this wagon is so constructed that when its dump box is in the tilted emptying position the center of gravity is shifted well to one side of center. Because there is no compensation provided by the under-carriage of this box there is always the danger that the wagon will tilt over sideways causing damage to the dump truck into which its load is being emptied. There is the further disadvantage that in travelling over uneven ground it is possible that the box wagon apparatus can be toppled over rather too easily.

These disadvantages are obviated by my invention. My portable dump box has an automatic frame levelling mechanism which functions both when the portable dump box is in motion over the field being harvested and when it is stopped and the box tilted to empty the collected load into the dump truck.

SUMMARY OF THE INVENTION

The portable dump box according to my invention comprises a wheeled carriage including an axle having wheels rotatably mounted at opposite ends thereof, a frame, a dump box, means for tilting the dump box and means for maintaining the frame level. The axle is below and pivotably moveable relative to the frame about the longitudinal axis of the carriage. The dump box is hingedly joined to the frame along a longitudinal edge thereof at a point of the same remote from the ground. The means for tilting the dump box comprises at least one hydraulic jack positioned to pivot the dump box on the hinged joint about an axis longitudinal to said frame. The means for maintaining the frame level comprises a pair of hydraulic jacks, a first member of each jack being fixed to said frame at or near opposite longitudinally extending edges thereof, a second member of each jack being fixed to the axle at or near opposite ends thereof, a hydraulic fluid line extending from one jack to the other, whereby an upward action on the first element in one jack produces a downward reaction in the second element on the other jack. There are valve means in the hydraulic fluid line having an open position permitting two-way flow of fluid and a closed position permitting no flow of fluid, the valve means being in the open position when the dump box is at rest and in the closed position during substantially the entire tilting operation.

In one embodiment a pair of hydraulic jacks serve as the tilting means for said dump box.

In a preferred embodiment of the invention there is a common source of hydraulic fluid for both the tilting hydraulic jack or jacks and the levelling hydraulic jacks.

BRIEF DESCRIPTION OF THE DRAWINGS

FIG. 4 appears on the same page of drawings as FIG. 1.

DESCRIPTION OF THE PREFERRED EMBODIMENTS

Figure 1:
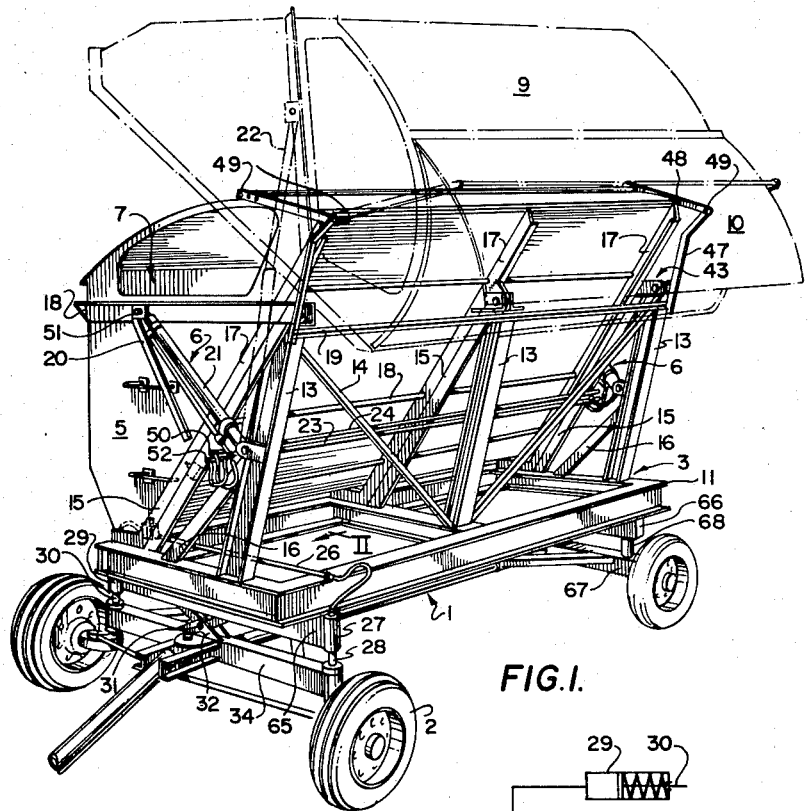
FIG. 1 is a view in perspective of the dump box wagon of this invention, the box being shown in both a charging and discharging (shown in ghost) position.

Referring now to the drawings, dump box 5 is hingedly joined to frame 3 which is itself mounted on carriage 1. This carriage is adopted to be towed behind a harvester (not shown) having a backwardly directed blower or equivalent loading means; the harvester is, itself, towed by a tractor (also not shown). On the tractor is provided a hydraulic pressure producing means for the hydraulic system on the portable dump box. The harvested forage is charged into the dump box 5 through charge opening 7 and is dumped from discharge opening 8. Dump box 5 has a fixed lid portion 9 and an openable lid portion 10. The dump box is tilted by means of tilting jacks 6 located at its opposite ends. It can be seen that a single jack mounted on central vertical frame member 13 could equally well be employed to tilt the box.

Frame 3 consists of a horizontal bed portion 11, diagonal vertical members 13, diagonal reinforcing members 14, diagonal vertical frame reinforcing members 15, reinforcing cross-members 16 and horizontal frame reinforcing members 19.

Reinforcing members 18 give rigidity to the sheet metal employed in the dump box. Vertical rib members 17 of the dump box 5 abut diagonal vertical frame reinforcement members 15 when the dump box is in a rest position. Bracing member 20 reinforces the pivotable point 51 at which lifting jack 6 joins dump box 5.

Figure 2:
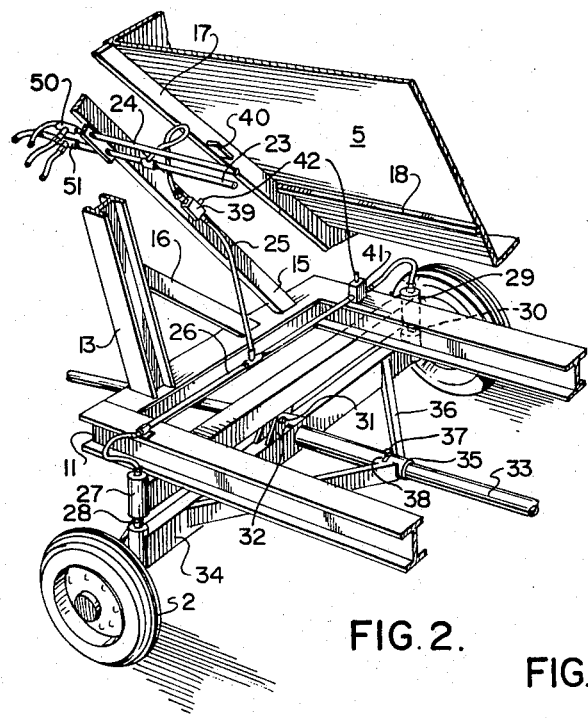
FIG. 2 is a fragmentary perspective in detail indicated generally by arrow II in FIG. 1.

The carriage 1 is of the convention farm wagon type. At either end of front axle 34 and of rear axle 67 are rotatably mounted low pressure pneumatic tires 2. The front wheels are steerable with a conventional push-pull assembly as shown in FIG. 1. Referring specifically to FIG. 2, it can be seen that axle 34 is pivotable about the longitudinal axis of the carriage. Bracing members 36 extend from front axle 34 to a sleeve 35. Through sleeve 35 is cut an oval hole 38 through which bolt 37 extends into longitudinal carriage member 33. Sleeve 35 can be pivoted about longitudinal frame member 33 within the limits defined by oval hole 38, pin 37 being rigid with longitudinal member 33. Two upwardly extending V-shaped brackets are fixed to front axle 34 and two corresponding downwardly extending V-shaped brackets are fixed to front transverse frame member 65 so that the upper brackets can be fitted between the lower brackets. Pin 31 is bearingly mounted through these brackets to form a pivotal point permitting front axle 34 to pivot relative to horizontal frame bed 11 to about the longitudinal axis of the carriage. This pivoting movement is controlled by levelling jacks at either side of the frame. These jacks comprise cylinders 27 and 29 fixed to the front transverse frame member 65 and pistons 28 and 30 to front axle 34 near the ends thereof. Referring particularly to FIG. 1, when a rise in the surface over which the portable dump box is being driven occurs under left front wheel 2, piston 28 is forced upwardly into cylinder 27 driving fluid along line 26 into cylinder 29 thus forcing piston 30 downwardly. This automatically levels the horizontal frame bed 11. The inverse situation occurs when the right front wheel rises over an undulation on the ground.

In the embodiment shown in FIG. 1 rear transverse frame member 66 is rigidly fixed to rear axle 67 by mounting pins 68. However, it can be seen that a frame levelling mechanism can be installed on the rear of the frame which operates in a manner identical to that of the frame levelling mechanism shown at the front of the carriage. In the embodiment shown the rear axle is in a fixed spaced relationship to the frame which is permitted by the pivoting of the front axle 34 relative to longitudinal member 33, as described above.

Figure 3:
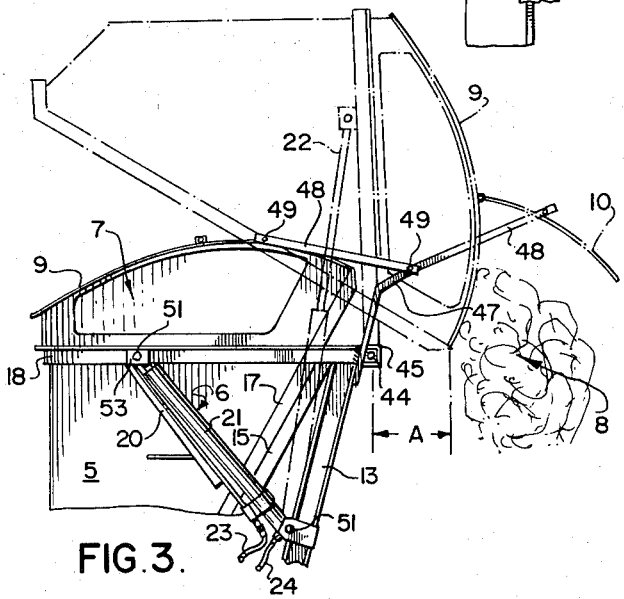
FIG. 3 is a view in front elevation of the dump box wagon showing the box tilting mechanism in detail; the discharging box being represented in ghost.

Referring to FIG. 3 the tilting operation will now be described. Hydraulic fluid pressure in line 23 is transmitted into cylinder 21 driving the piston rod 22 outwardly and upwardly to the fully tilted position shown in ghost. Return pressure on line 24 is transmitted to cylinder 21 above the piston located therein driving piston rod 22 downwardly into cylinder 21, the fluid below the piston being driven outwardly through line 23.

Tilting jacks 6 are positioned on vertical frame member 13 and on box reinforcing rib 18 so as to achieve the shortest possible travel of the piston rod. While a high pressure hydraulic pump provides more rapid tilting a lower pressure unit may be employed.

In a preferred embodiment the tilting jacks are double-acting having chromium plated shafts and "Teflon" (a Dupont trade mark for polytetrafluoroethylene) sealing rings. The cylinder has a 3½-inch bore providing a lifting force of 9,620 pounds with hydraulic pressure of 1,000 psi.

Fixed arm 47 and lever arm 48 are pivotably joined to each other and to lid 10 by pins 49. As box 5 is tilted lever arm 48 forces lid 10 open thus allowing the load to be emptied from box 5.

The box 5 has a modified substantially triangular cross-section but its shape is not of particular importance so long as it allows for the free flow of the load in the tilted position. Opening 7 and lid portions 9 and 10 are important in the harvesting of silage. The lid portions prevent the loss of the fine dust particles of the crop being blown into the dump box. However, in an application such as snow removal, it can be seen that such a lid is not necessary.

Figure 5:
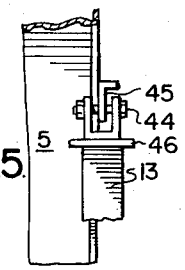
FIG. 5 is a detail of hinge 43 of FIG. 1.

The dump box is hinged to the tops of the diagonal vertical frame members 13. Hinge 43 shown at the rear of the apparatus in FIG. 1 is detailed in FIG. 5. A U-shaped bracket 46 is fixed to the top of frame member 13 and extension 45 of box horizontal rib member 18 (corresponding to front rib member 18 which is more readily apparent) passes between the upright plates of U-bracket 46. Pin 44 passes through extension 45 and the two upward plates of U-bracket 46, being bearingly mounted therein to permit rotation thereabout.

Referring to FIG. 3, the distance A between the stippled vertical lines represents the clearance between wheels 2 on the left hand side of carriage 1 and the lip of opening 8 of box 5. The box should be hinged in such a position that this clearance is sufficient to permit easy maneuvering of a dump truck so that the side of its box extends upwardly within the area designated by A. Tilting is carried out when the carriage is standing still.

Figure 4:
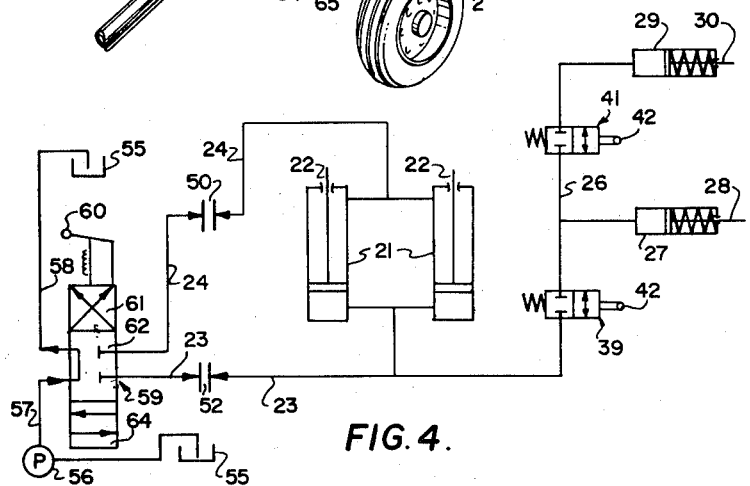
FIG. 4 is a schematic representation of the hydraulic system of the dump box wagon of this invention.

FIG. 4 schematically represents the hydraulic system of this invention. Connections 50 and 52 join the trailer section and the tractor section of lines 24 and 23, respectively. The portions of the hydraulic systems on the tractor are not shown in detail but merely represented in schematic to the left of connections 50 and 52. Hydraulic fluid is pumped from reservoir 55 by pump 56 through line 57 into control valve 59. In the configuration shown this valve is in the closed position 62 and fluid merely returns along line 58 to reservoir 55. When control lever 60 is moved upwardly control valve 59 assumes the tilting position 64. Fluid from line 57 flows along line 23 into cylinders 21 below the pistons driving piston rods 22 upwardly. Fluid above the pistons returns along line 24 through valve position 64 along line 58 to reservoir. When control lever 60 is pushed downwardly a crossover configuration 61 occurs in valve 59. Fluid from line 57 crosses over into line 24 and enters cylinders 21 above the pistons driving piston rods 22 downwardly. Fluid from below the pistons returns along line 23 through the crossover position 61 of control valve 59 into line 58 and back to reservoir 55.

Referring to FIG. 1 can be seen that as dump box 5 begins to tilt the center of gravity shifts to the hinging side of the frame. This forces cylinder 27 downwardly onto piston 28 driving fluid into cylinder 29 and thus raising the lightened side of the frame work. It is obvious that if this action were permitted to continue to its ultimate end the apparatus would be capable of upsetting itself. To prevent this there is provided in hydraulic line 26 a hydraulic switch 41 having an activating plunger 42. As can thus be seen in FIG. 2 when dump box 5 lifts away from switch 41 plunger 42 is released. A spring at the bottom of switch 41 shown in FIG. 4 mechanically activates the switch into a closed position. This prevents crossflow from cylinder 27 to cylinder 29 while the box is being tilted and returned to its rest position and the frame remains level, it being understood that during the tilting operation the carriage is at rest.

The frame levelling mechanism of the invention is shown at the right hand side of FIG. 4. Hydraulic fluid under pressure is transmitted from line 23 through line 25 to crossover line 26 between spring loaded piston and cylinder assemblies 27 and 28, and 29 and 30 in the embodiment shown. Line 25 could equally well be joined to line 24 to receive the necessary hydraulic pressure. A problem that arises in this system represented in FIG. 4 is that when control valve 59 is in crossover position 61 fluid returning along line 23 would be at a lower pressure than fluid in line 25. Fluid from the cylinder 27 would then flow into line 23 causing the corner of the frame above piston 27 to sag. To prevent this from happening a second hydraulic switch 39, identical to switch 41, is provided as shown in FIG. 2. Plate 40 fixed to rib member 17 abuts plunger 42 of switch 39 in the rest position but as box 5 tilts away from switch 39 plunger 42 is released and the spring in switch 39 causes it to assume a closed position. When control valve 59 is in a closed position 62 the entire system from line 25 to the left to valve position 62 is completely closed and the only fluid flow permitted is between cylinder 29 and cylinder 27.

If line 25 were joined to line 24 low pressure in line 24 would allow fluid to flow from cylinder 27 during the tilting action when the direction of flow in line 24 is toward the system reservoir. It can be seen that in this configuration switch 39 would also serve to prevent this undesired back-flow.

A simple one-way check valve permitting flow of fluid only from either line 23 or line 24 into line 25 could also be employed in place of switch 39. Because the levelling hydraulic system functions apart from the tilting hydraulic system it is not necessary that they have the same hydraulic fluid source. Line 25 could be separately fed with a hydraulic fluid source and the two systems would continue to function in the same manner. It is for compactness of operation that the two systems have a common hydraulic fluid source.

What I claim is:

1. A portable dump box comprising a wheeled carriage including an axle having wheels rotatably mounted at opposite ends thereof, a frame, a dump box, means for tilting said dump box and means for maintaining said frame level, said axle being below and pivotably movable relative to said frame about the longitudinal axis of said carriage, said dump box being hingedly joined to said frame along a longitudinal edge thereof at a point of the frame remote from the ground, said means for tilting said dump box comprising at least one hydraulic jack positioned to pivot said dump box on said hinged joint about an axis longitudinal to said frame, said means for maintaining said frame level comprising a pair of hydraulic jacks, a first member of each jack being fixed to said frame at or near opposite longitudinally extending edges thereof, a second member of each jack being fixed to said axle at or near opposite ends thereof, a hydraulic fluid line extending from one jack to the other, whereby an upward action on the first element in one jack produces a downward reaction on the second element in the other jack, and, valve means in said hydraulic fluid line having an open position permitting two-way flow of fluid and a closed position permitting no flow of fluid, said valve means being in said open position when said dump box is at rest and in said closed position during substantially the entire tilting operation.

2. A portable dump box as claimed in claim 1 wherein said means for tilting said dump box comprises a pair of hydraulic jacks mounted at opposite ends of said frame.

3. A portable dump box is claimed in claim 2 which includes a further axle below and in a fixed spaced relationship with said frame.

4. A portable dump box as claimed in claim 2 which includes a further axle below and pivotably movable relative to said frame about the longitudinal axis of said frame.

5. A portable dump box as claimed in claim 2 wherein said valve means is a mechanically activated hydraulic switch having a switching mechanism comprising a spring and opposed thereto a plunger, said switch being open when said spring is compressed and closed when said spring is released.

6. A portable dump box as claimed in claim 5 wherein said dump box is adapted so that at rest it abuts and depresses said plunger compressing said spring and when tilted it releases said plunger releasing said spring.

7. A portable dump box as claimed in claim 2 wherein hydraulic fluid is transmitted through a secondary hydraulic fluid line into said hydraulic fluid line extending from one levelling jack to the other from a primary hydraulic fluid line which transmits fluid to said tilting hydraulic jacks, a mechanically activated hydraulic switch having a switching mechanism comprising a spring and opposed thereto a plunger, said switch being open when said spring is compressed and closed when said spring is released, being provided in said secondary hydraulic fluid line.

8. A portable dump box as claimed in claim 2 wherein hydraulic fluid is transmitted through a secondary hydraulic fluid line into said hydraulic fluid line extending from one levelling jack to the other from a primary hydraulic fluid line which transmits fluid to said tilting hydraulic jacks, a check valve being provided in said secondary hydraulic fluid line, said check valve permitting flow of fluid from said primary to said secondary line but preventing flow from said secondary to said primary line.

* * * * *